(12) United States Patent
Theogaraj et al.

(10) Patent No.: US 11,349,808 B2
(45) Date of Patent: May 31, 2022

(54) INTERNET PROTOCOL SECURITY MESSAGES FOR SUBNETWORKS

(71) Applicant: Hewlett Packard Enterprise Development LP, Houston, TX (US)

(72) Inventors: Isaac Theogaraj, Bangalore (IN); Reji Varghese, Bangalore (IN); Sivappirakasam Muthiah, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 490 days.

(21) Appl. No.: 16/183,947

(22) Filed: Nov. 8, 2018

(65) Prior Publication Data

US 2019/0334866 A1 Oct. 31, 2019

(30) Foreign Application Priority Data

Apr. 30, 2018 (IN) .............................. 201841016310

(51) Int. Cl.
*H04L 9/40* (2022.01)
*H04L 9/08* (2006.01)

(52) U.S. Cl.
CPC ........ *H04L 63/0209* (2013.01); *H04L 63/061* (2013.01); *H04L 9/0838* (2013.01); *H04L 63/06* (2013.01)

(58) Field of Classification Search
CPC ... H04L 63/0209; H04L 63/061; H04L 63/06; H04L 9/0838; H04L 29/06; H04L 9/08; H04L 9/40
See application file for complete search history.

(56) References Cited

U.S. PATENT DOCUMENTS

| 7,028,183 | B2 | 4/2006 | Simon et al. |
| 7,848,335 | B1 * | 12/2010 | Kang ................... H04L 12/4633 370/401 |
| 8,320,279 | B2 | 11/2012 | Sarkar et al. |
| 8,611,359 | B1 | 12/2013 | Kompella et al. |

(Continued)

FOREIGN PATENT DOCUMENTS

| CN | 102420740 A | * | 4/2012 | ............. H04L 63/06 |
| CN | 109076344 A | * | 12/2018 | .......... H04L 61/1511 |

OTHER PUBLICATIONS

Cisco Publication—Scalable DMVPN Design and Implementation Guide, Network Systems Integration & Test Engineering (NSITE), Document Version No. 1.1, 2007 (Year: 2007).*

(Continued)

*Primary Examiner* — Jayesh M Jhaveri
(74) *Attorney, Agent, or Firm* — Hewlett Packard Enterprise Patent Department

(57) ABSTRACT

An end controller, comprising: a processing resource; and a memory resource storing machine-readable instructions to cause the processing resource to: receive, using internet protocol security (IPSec) messages, a plurality of subnetworks that form a route to a branch device via a branch gateway; transfer the plurality of subnetworks to a layer-2-layer-3 module; transfer the plurality of subnetworks to an open shortest path first (OSPF) module; and publish the plurality of subnetworks that form the route to the branch device to a core router using OSPF link state advertisements (LSAs).

20 Claims, 4 Drawing Sheets

(56) References Cited

U.S. PATENT DOCUMENTS

| | | | |
|---|---|---|---|
| 2004/0091117 A1* | 5/2004 | Narayanan | H04L 63/045 380/277 |
| 2011/0231654 A1* | 9/2011 | Somadder | H04L 12/5691 713/153 |
| 2016/0080195 A1* | 3/2016 | Ramachandran | H04L 45/38 370/220 |
| 2016/0164845 A1* | 6/2016 | Mao | H04L 63/0272 726/13 |
| 2017/0012870 A1* | 1/2017 | Blair | H04L 45/04 |
| 2017/0244622 A1* | 8/2017 | Salgueiro | H04L 41/5035 |
| 2017/0346722 A1* | 11/2017 | Smith | H04L 45/308 |
| 2018/0019976 A1 | 1/2018 | Ben-Shalom et al. | |
| 2018/0191669 A1* | 7/2018 | Barton | H04L 45/02 |

OTHER PUBLICATIONS

Bahnasse, A. et al., Study and Analysis of a Dynamic Routing Protocols' Scalability over a Dynamic Multi-point Virtual Private Network, (Research Paper), Aug. 2015, 6 Pgs., Retrieved from the Internet Feb. 27, 2018 from URL: <ciscopress.com/articles/article.asp?p=1763921&seqNum=6>.

Tiso, J., Designing Cisco Network Service Architectures (arch): Developing an Optimum Design for Layer 3 (CCDP), (Web Page), Dec. 8, 2011, 15 Pgs., Retrieved from the Internet on Feb. 27, 2018 from URL: <ciscopress.com/articles/article.asp?p=1763921&seqNum=6>.

European Search Report and Search Opinion Received for EP Application No. 18177917.4, dated Dec. 19, 2018, 15 pages.

Cisco: "Scalable DMVPN Design and Implementation Guide", Network Systems Integration & Test Engineering (NSITE), Document Version No. 1.1, Dec. 31, 2007, 143 pages.

Cisco Systems, Inc., "IPsec Direct Encapsulation VPN Design Guide", 2006, pp. 1-41.

* cited by examiner

INTERNET PROTOCOL SECURITY MESSAGES FOR SUBNETWORKS

BACKGROUND

In some networks, access points (APs) or routers may provide network connectivity to client devices. The AP may be installed at a branch of a larger network and may be referred to as a branch device. The network may provide connectivity to offices, residences, restaurants, university campuses, etc.

Figure 1:
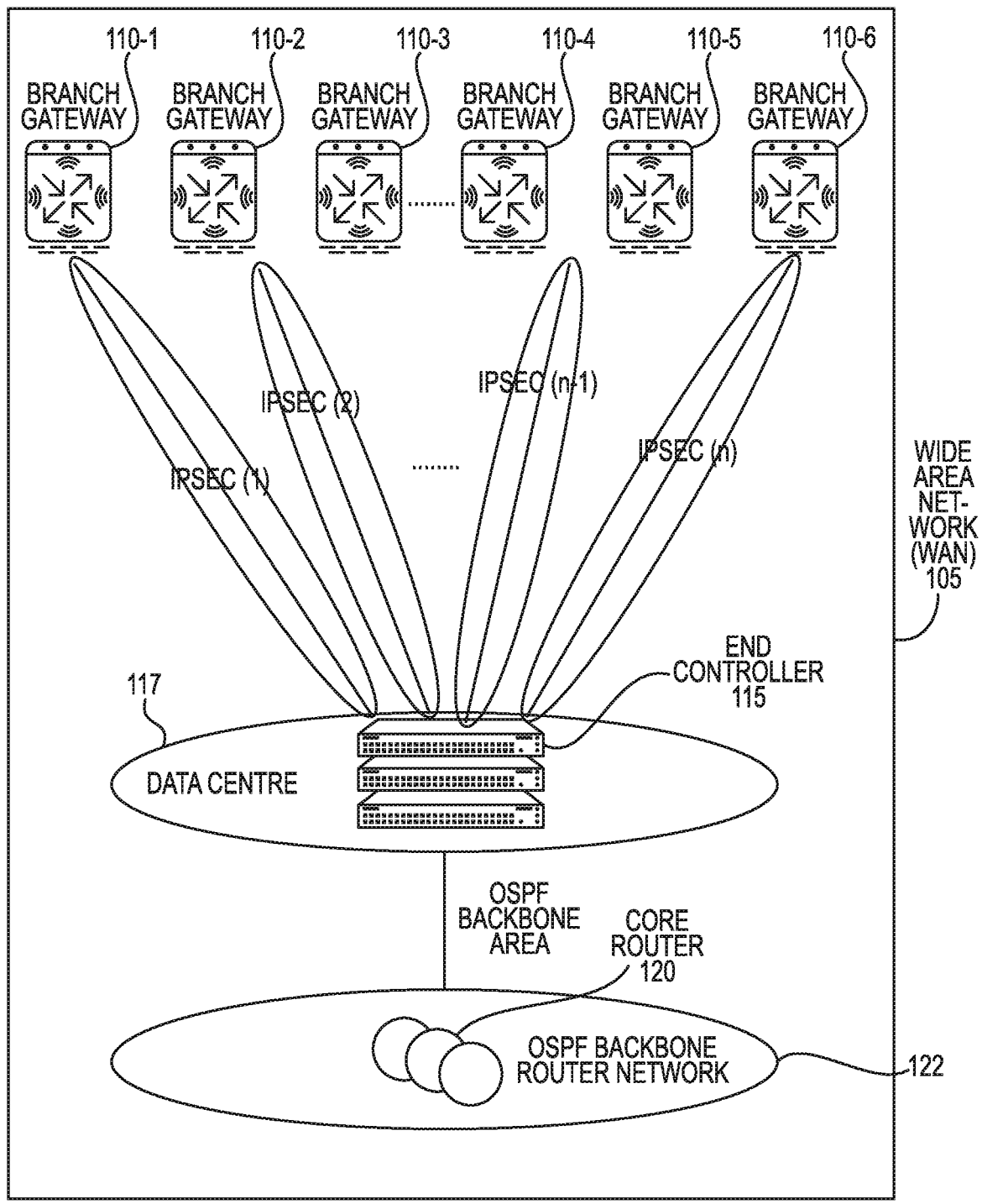
FIG. 1 illustrates an example environment consistent with the disclosure.

In a communications network, access points (APs) can provide network connectivity to client devices connected to the APs. For example, several personal computers, laptops, etc. may be connected to an AP for Internet access. A wide area network (WAN) may include many APs, including APs that provide network connectivity at a branch of the WAN (e.g., a software defined wide area network (SDWAN) branch). Such APs and/or the client devices connected to such APs may be referred to as branch devices. The branch devices may be connected to the rest of the WAN via an end controller situated in a data center. The end controller may be involved in routing network traffic to and from the branch devices and may be aware of routes to accomplish this purpose. The routes may be configured by the end controller and stored in a database on the end controller. The end controller may use open shortest path first (OSPF) protocol to communicate routing information between the branch devices and the end controller as well as between the end controller and the rest of the WAN (the core part of the WAN). As a consequence of the fact that OSPF protocol is used twice to communicate route information about each branch device, the quantity of data stored on the database for routing may be a square of a number of branch devices. In other words, the amount of routing information stored on the database may be quadratically related to the number of branches to which the routing information pertains. In a number of examples, this can limit the number of branches that an end controller can manage since the storage space on the end controller is finite.

In some examples consistent with the disclosure, an end controller may receive routing information pertaining to routing to a branch device using Internet protocol security (IPSec) messages. IPSec may refer to protocols for establishing mutual authentication between agents at the beginning of the session and negotiation of cryptographic keys to use during the session. IPSec can be used for communication between an end controller and a branch device, between a client device and an access point, between a client device and another client device, and between an access point and another access point, or between other devices. In such examples consistent with the disclosure, the end controller may publish the information pertaining to routing to a branch device using OSPF link state advertisements (LSAs). The end controller may store this information on a database stored on the end controller. In such examples consistent with the disclosure, the quantity of data stored on the database of the end controller may be linearly proportional to a number of branch devices managed by the end controller as a consequence of the fact that the OSPF protocol is used for communication once for configuration of a particular route to the branch device. In other words, as the number of branches managed by the end controller increases, the quantity of data increases linearly. Such a relationship between the quantity of data and the number of branches allows for management of a larger quantity of branches by an end controller having a finite storage space for routing information.

As used herein, access point (AP), can, for example, refer to a networking hardware device that allows a client device to connect to a wired or wireless network. An AP can include a processing resource, a memory, and input/output interfaces, including wired network interfaces such as IEEE 802.3 Ethernet interfaces, as well as wireless network interfaces such as IEEE 802.11 WLAN interfaces, although examples of the disclosure are not limited to such interfaces. An AP can include memory, including read-write memory, and a hierarchy of persistent memory such as ROM, EPROM, and Flash memory. The processing resource of the AP may be a central processing unit (CPU), microprocessor, and/or other hardware device suitable for retrieval and execution of instructions stored in the memory of the AP, as further described below. Further, AP can generally refer to receiving points for any known or convenient wireless access technology which may later become known. Specifically, the term AP is not intended to be limited to IEEE 802.11-based APs. APs generally may function as electronic devices that are adapted to allow wireless communication devices to connect to a wired network via various communication standards.

As used herein, a client device can, for example, refer to a device including a processor, memory, and input/output interfaces for wired and/or wireless communication. A client device may include a laptop computer, a desktop computer, a mobile device, an IoT device, and/or other wireless devices, although examples are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

As used herein, a branch device can, for example, refer to an access point or a client device as defined above, where the access point or the client device is part of a particular branch of a wide area network with multiple branches.

As used herein, a controller (such as an end controller or a gateway controller) can, for example refer to a device including a processor, memory, and input/output interfaces for wired and/or wireless communication with a number of access points to manage the access points.

FIG. 1 illustrates an example environment consistent with the disclosure. As shown, a wide area network (WAN) 105 that includes an end controller 115 in a hub-and-spoke topology with branch gateways 110-1, 110-2, 110-3, 110-4, 110-5, and 110-6. In some examples, another number of branch gateways 110-1 to 110-6 may be managed by the end controller. The end controller 115 may be situated in a data center 117 located remote from the branch gateways 110-1 to 110-6. As an example, the branch gateways 110-1 to 110-6 may each be located at a separate geographical branch of an enterprise. The WAN 105 may further include an open shortest path first (OSPF) backbone router network 122 that comprises a core router 120, for example. The OSPF backbone router network 122 may refer to an area of the WAN that is adjacent to all other areas of the WAN and serves as a center point for routing from one area to another.

As shown in FIG. 1, the end controller 115 may be in communication with each of the branch gateways 110-1 to 110-6 via IPSec messages sent back and forth between the end controller 115 and each branch gateway 110-1 to 110-6. Additionally, the end controller 115 may be in communication with the core router 120 via OSPF link state advertisements (LSAs).

Figure 2:
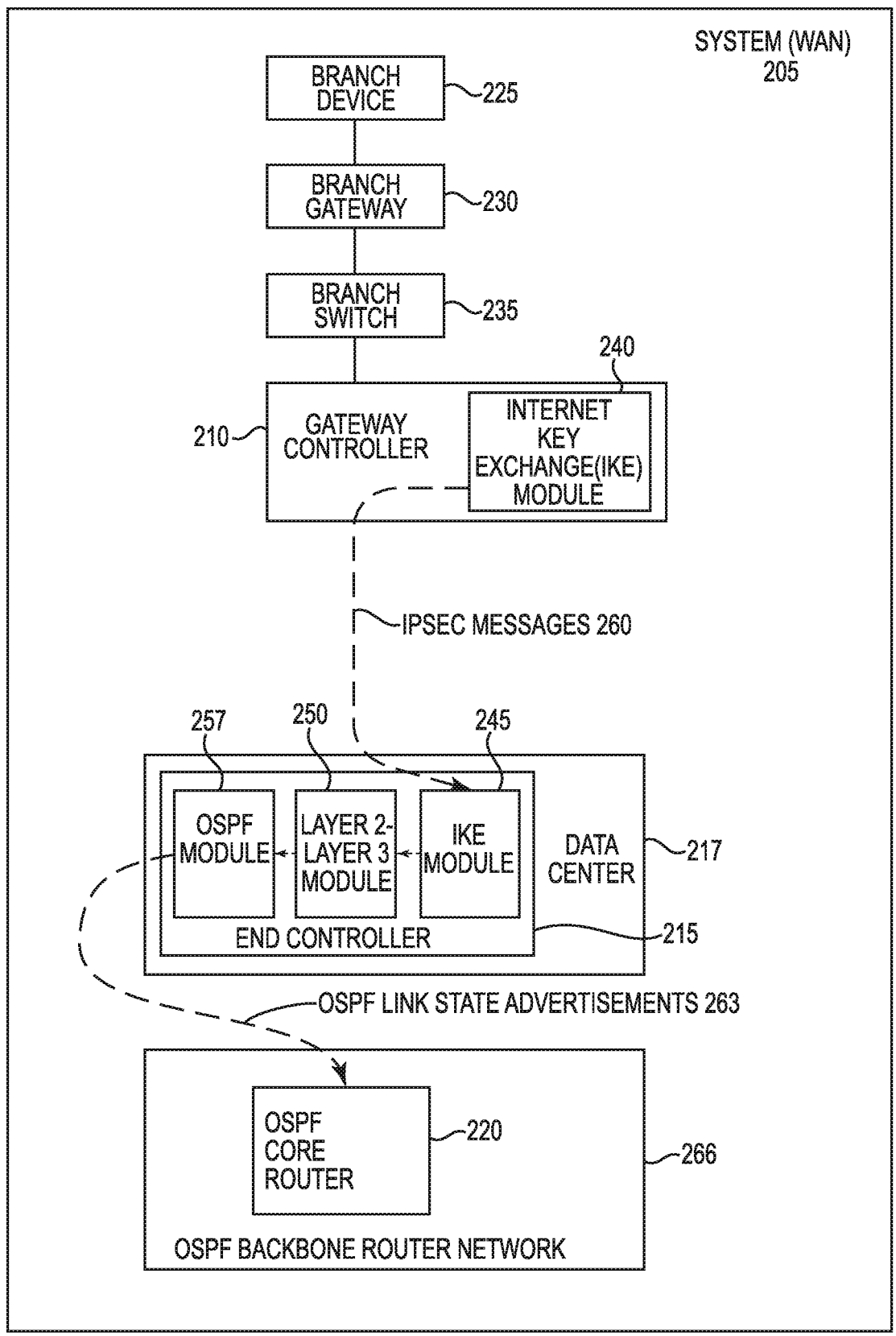
FIG. 2 illustrates a detailed example environment consistent with the disclosure.

FIG. 2 illustrates a detailed example environment consistent with the disclosure. As shown, a WAN 205 includes an OSPF backbone router network 266, a data center 217, and a branch device 225. The WAN 205 may further include a branch gateway 230, a branch switch 235 and a gateway controller 210, each of which is positioned between the data center 217 and the branch device 225. As further shown, the gateway controller may include an internet key exchange (IKE) module 240 for relaying IPSec messages to and from the end controller 215. As further shown, the end controller 215 may include another IKE module 245 for relaying IPSec messages to and from the gateway controller 210. The end controller 215 may further include a layer-2-layer-3 module 250 in communication with the IKE module 245 and an OSPF module 257 in communication with the layer-2-layer-3 module 250. As further shown, the OSPF module 257 of the end controller 215 is in communication with an OSPF core router 220 included within the OSPF backbone router network 266. It should also be noted that the gateway controller 210 is in communication with the branch switch 235, which is in communication with the branch gateway 230, which is in communication with the branch device 225. In this way, the branch device 225 can communicate with the OSPF core router 220.

Figure 3:
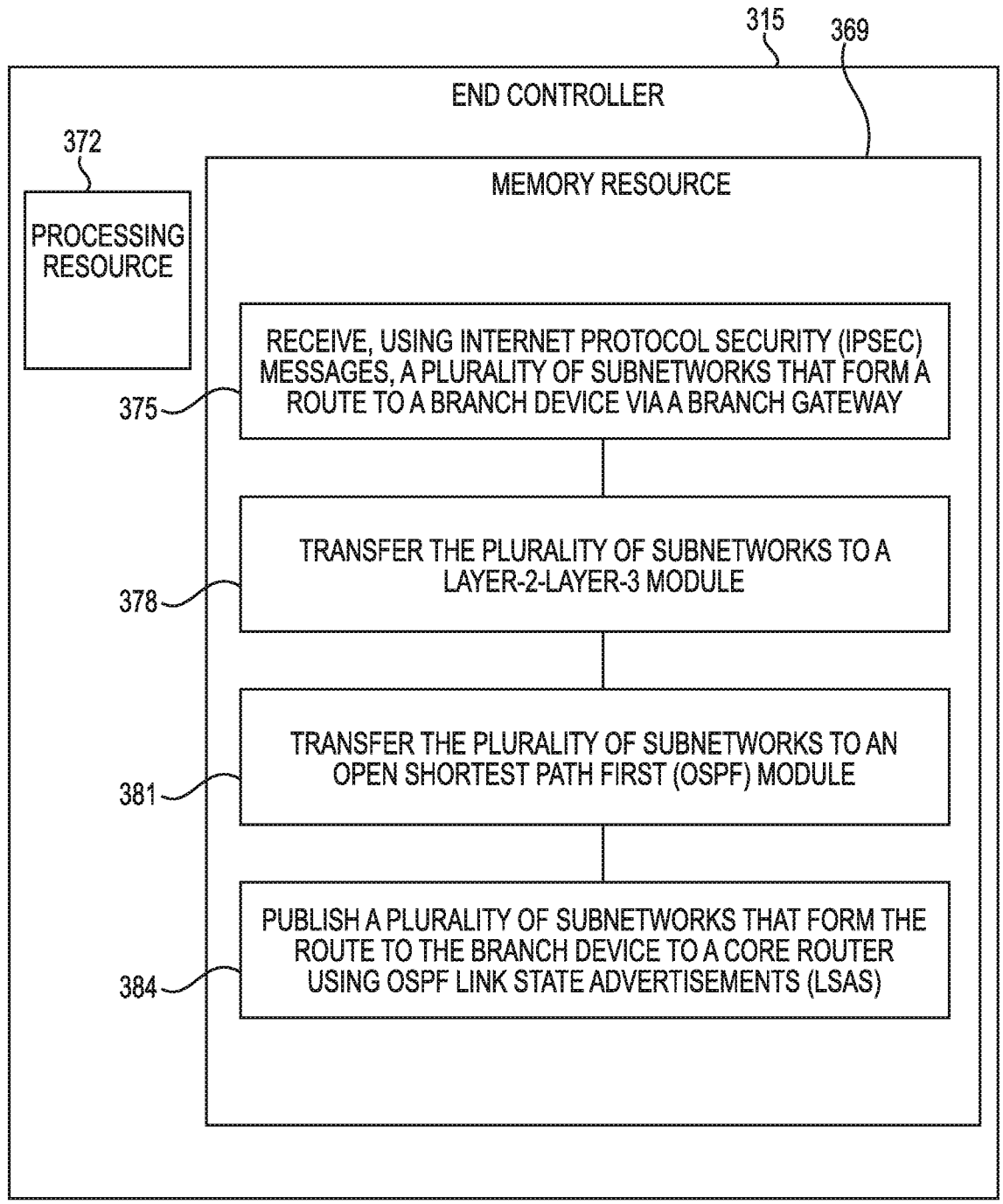
FIG. 3 illustrates an example apparatus consistent with the disclosure.

FIG. 3 illustrates an example apparatus consistent with the disclosure. In particular, FIG. 3 illustrates an end controller 315 used for managing a number of branch gateways and/or branch devices connected to the branch gateways. The end controller 315 may include a processing resource 372 and a memory resource 369. The memory resource 369 of the end controller 315 may store machine-readable instructions to cause the processing resource 372 to perform some or all of 375 to 384 of FIG. 3, described in greater detail below.

In a number of examples, one of or some combination of an IKE module of the end controller 315, a layer-2-layer-3 module of the end controller 315, and an OSPF module of the end controller 315 may include a memory resource that stores machine-readable instructions to cause a processing resource to perform some or all of 375 to 384 of FIG. 3. In other examples, a device or a combination of devices included within the wide area network (e.g., the system 205 of FIG. 2) may store machine-readable instructions on a memory resource to cause a processing resource to perform some or all of 375 to 384 of FIG. 3.

At 375, the end controller 315 may receive, using internet protocol security (IPSec) messages, a plurality of subnetworks that form a route to a branch device via a branch gateway. As an example, the plurality of subnetworks includes four subnetworks. In a number of examples, the branch device is one of a number of branch devices connected to the end controller 315 and wherein a quantity of data (routing information received using IPSec messages) stored on a LSA database by the memory resource 369 is linearly proportional to the number of branch devices connected to the end controller 315.

In a number of examples, the number of branch devices are connected to the end controller in a hub-and-spoke topology. In some examples, the end controller 315, when receiving the plurality of subnetworks using the IPSec messages, is further to receive the plurality of subnetworks from an internet key exchange (IKE) module of a gateway controller connected to the end controller 315. Additionally, the IKE module may obtain the plurality of subnetworks from a layer2-layer3 module of the gateway controller. Additionally or alternatively, the plurality of subnetworks that form the route to the branch device are configured using a publisher-subscriber mechanism. The routes may be configured by a gateway controller, for example.

At 378, the end controller 315 may transfer the plurality of subnetworks to a layer-2-layer-3 module. For example, an IKE module of the end controller 315 may transfer the plurality of subnetworks to the layer-2-layer-3 module.

At 381, the end controller 315 may transfer the plurality of subnetworks to an OSPF module. For example, the layer-2-layer-3 module of the end controller 315 may transfer the plurality of subnetworks to the OSPF module.

Figure 4:
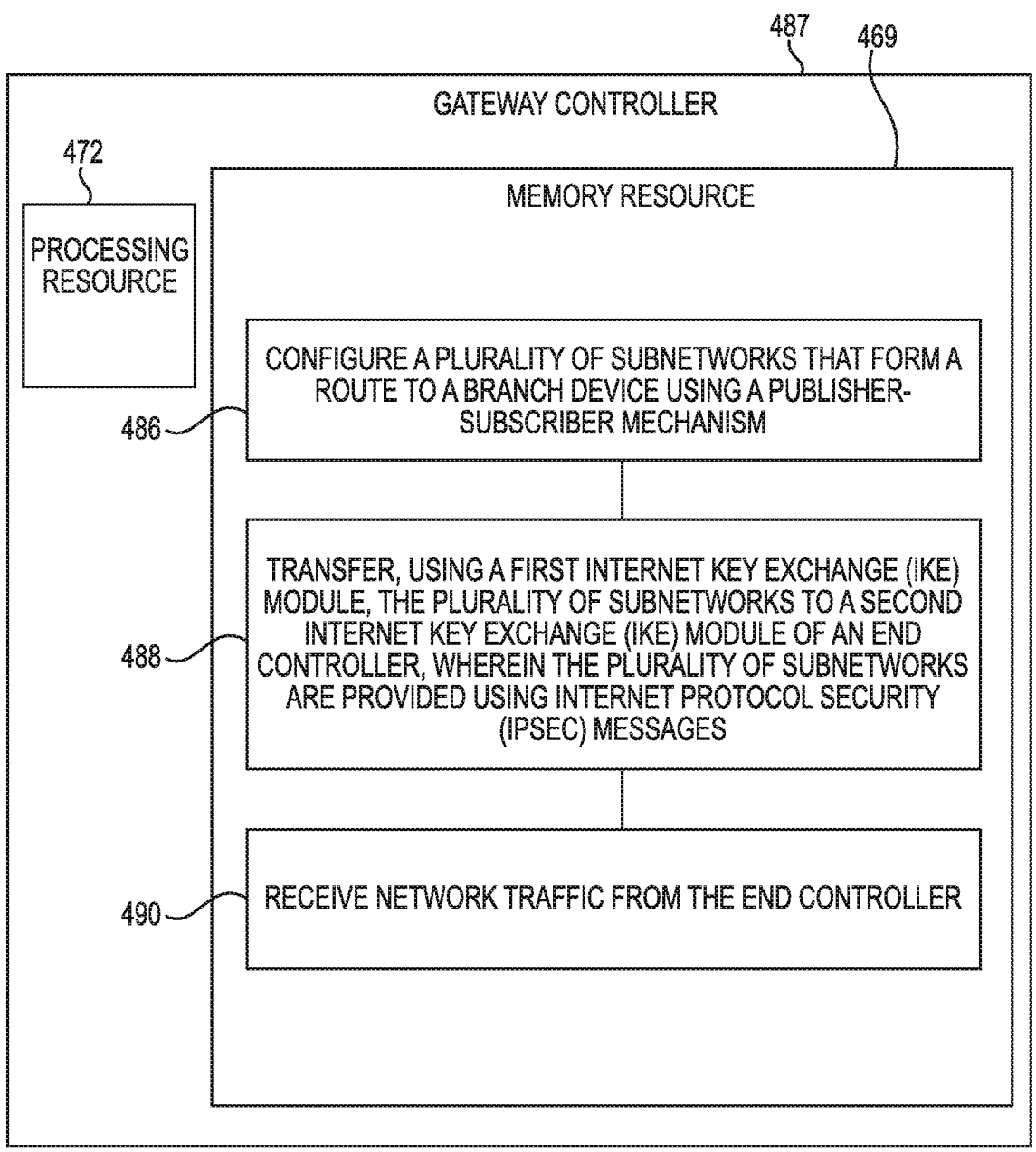
FIG. 4 illustrates another example apparatus consistent with the disclosure.

At 384, the end controller 315 may publish the plurality of subnetworks that form the route to the branch device to a core router using OSPF link state advertisements (LSAs). At this stage, the end controller 315 may forward network traffic based on an LSA database (stored by the memory resource 369) that includes the configured routing information for routing to a branch device. In other words, the LSA database is populated in view of the IPSec messages. Since a quantity of data stored in the LSA database is linearly proportional to a number of branches connected to the end controller, the LSA database can store route information of a greater number of branches than if the quantity of data stored in the LSA database was quadratically related to a number branches. For example, when the quantity of data is linearly proportional to the number of branches, the LSA database may be able to store routing information for branch devices of approximately 98,500 branch gateways, When the quantity of data is quadratically related to the number of branches, the LSA database may be able to store routing information for branch devices of approximately 313 branch gateways (because 313*313=97969, which is approximately 98,500). Thus, when there is a linear relationship, the same sized LSA database can manage many more branches and thus reduce costs associated with storing routing information. The linear relationship between the quantity of data stored on the LSA database and the number of branches is possible because the OSPF protocol is used once rather than twice (since the IPSec protocol is used to communicate between the end controller 315 and the gateway controller). In other words, examples consistent with the disclosure allow for greater OSPF neighbor scaling, FIG. 4 illustrates another example apparatus consistent with the disclosure. In particular, FIG. 4 illustrates a gateway controller 487 used for managing a number of branch devices. The gateway controller 487 may be in communication with an end controller at a data center as well as with a core router of a OSPF backbone network. The gateway controller 487 may include a processing resource 472 and a memory resource 469. The memory resource 469 of the gateway controller 487 may store machine-readable instructions to cause the processing resource 472 to perform some or all of 486 to 490 of FIG. 4, described in greater detail below.

In a number of examples, an IKE module of the gateway controller 487 may include a memory resource that stores machine-readable instructions to cause a processing resource to perform some or all of 486 to 490 of FIG. 4. In other examples, a device or a combination of devices included within the WAN (e.g., the system 205 of FIG. 2) may store machine-readable instructions on a memory resource to cause a processing resource to perform some or all of 486 to 490 of FIG. 4.

At 486, the gateway controller 487 may configure a plurality of subnetworks that form a route to a branch device using a publisher-subscriber mechanism. A publisher-subscriber mechanism is a messaging pattern where senders of messages, called publishers (for example, the gateway controller 487), do not program the messages to be sent directly to specific receivers, called subscribers (for example, branch devices), but instead categorize published messages into classes without knowledge of which subscribers, if any, there may be. Similarly, subscribers express interest in one or more classes and only receive messages that are of interest, without knowledge of which publishers, if any, there are. In some examples, the gateway controller is one of a number of gateway controllers connected to the end controller in a hub-and-spoke topology. Additionally, in some examples, the plurality of subnetworks comprises four subnetworks that form or define a route to the branch device. In some examples, the route to the branch device is via a branch switch connected to the gateway controller and via a branch gateway connected to the branch switch.

At 488, the gateway controller 487 may transfer, using a first internet key exchange (IKE) module, the plurality of subnetworks to a second internet key exchange (IKE) module of an end controller, wherein the plurality of subnetworks are provided using internet protocol security (IPSec) messages.

At 490, the gateway controller 487 may receive network traffic from the end controller and may forward network traffic to the branch device, In a number of examples, the gateway controller 487 is one of a plurality of gateway controllers, each belonging to a different software defined wide area network (SDWAN) branch connected to the end controller.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. An end controller, comprising:
   a processing resource; and
   a memory resource storing machine-readable instructions to cause the processing resource to:
      receive, using internet protocol security (IPSec) messages, routing information associated with a plurality of subnetworks that form a route to a branch device via a branch gateway;
      transfer the routing information associated with the plurality of subnetworks to a layer-2-layer-3 module, wherein the layer-2-layer-3 module receives the routing information associated with the plurality of subnetworks from an internet key exchange (IKE) module of the end controller;
      transfer the routing information associated with the plurality of subnetworks to an open shortest path first (OSPF) module, wherein the layer-2-layer-3 module transfers the routing information associated with the plurality of subnetworks received using IPsec messages to the OSPF module; and
      publish the routing information associated with the plurality of subnetworks that form the route to the branch device to a core router using OSPF link state advertisements (LSAs).

2. The end controller of claim 1, wherein the processing resource is further to forward network traffic based on an LSA database stored by the memory resource.

3. The end controller of claim 1, wherein the branch device is one of a number of branch devices connected to the end controller and wherein a quantity of data stored on the LSA database by the memory resource is linearly proportional to the number of branch devices connected to the end controller.

4. The end controller of claim 3, wherein the number of branch devices are connected to the end controller in a hub-and-spoke topology.

5. The end controller of claim 1, wherein the processing resource, when receiving the routing information associated with the plurality of subnetworks using the IPSec messages, is further to receive the routing information associated with the plurality of subnetworks from an internet key exchange (IKE) module of a gateway controller, wherein the IKE module obtains the routing information associated with the plurality of subnetworks from a layer2-layer3 module of the gateway controller.

6. The end controller of claim 5, wherein the routing information associated with the plurality of subnetworks that form the route to the branch device are configured using a publisher-subscriber mechanism.

7. The end controller of claim 1, wherein the plurality of subnetworks comprises four subnetworks that form a route to the branch device.

8. A gateway controller, comprising:
   a processing resource; and
   a memory resource storing machine-readable instructions to cause the processing resource to:
   configure routing information associated with a plurality of subnetworks that form a route to a branch device using a publisher-subscriber mechanism;
   transfer, using a first internet key exchange (IKE) module, the routing information associated with the plurality of subnetworks to a second internet key exchange (IKE) module of an end controller, wherein the routing information associated with the plurality of subnetworks is provided to the end controller using internet protocol security (IPSec) messages such that the routing information associated with the plurality of subnetworks that form the route to the branch device is published by the end controller using OSPF link state advertisements (LSAs); and receive network traffic from the end controller.

9. The gateway controller of claim 8, wherein the gateway controller is one of a number of gateway controllers connected to the end controller in a hub-and-spoke topology.

10. The gateway controller of claim 8, wherein the plurality of subnetworks comprises four subnetworks that form a route to the branch device.

11. The gateway controller of claim 8, wherein the route to the branch device is via a branch switch connected to the gateway controller and via a branch gateway connected to the branch switch.

12. The gateway controller of claim 8, wherein the processing resource is further to forward network traffic to the branch device.

13. The gateway controller of claim 8, wherein the gateway controller is one of a plurality of gateway controllers, each belonging to a different software defined wide area network (SDWAN) branch connected to the end controller.

14. A system, comprising: a branch device;
a gateway controller in communication with the branch device;
an end controller in communication with the gateway controller; and
a core router in communication with the end controller, wherein the end controller is to:
receive, using internet protocol security (IPSec) messages, routing information associated with a plurality of subnetworks that form a route to a branch device via a branch gateway;
transfer the routing information associated with the plurality of subnetworks to a layer-2-layer-3 module, wherein the layer-2-layer-3 module receives the routing information associated with the plurality of subnetworks from an internet key exchange (IKE) module of the end controller;
transfer the routing information associated with the plurality of subnetworks to an open shortest path first (OSPF) module, wherein the layer-2-layer-3 module transfers the routing information associated with the plurality of subnetworks received using IPsec messages to the OSPF module; and
publish the routing information associated with the plurality of subnetworks that form the route to the branch device to a core router using OSPF link state advertisements (LSAs).

15. The system of claim 14, wherein the end controller comprises the layer2-layer3-module, the OSPF module, and the IKE module to receive the IPSec messages.

16. The system of claim 14, wherein the end controller is part of a data center.

17. The system of claim 14, wherein the core router is part of an OSPF backbone router network.

18. The system of claim 14, wherein the end controller is further to forward network traffic based on an LSA database stored on the end controller, wherein the LSA database is populated in view of the IPSec messages.

19. The system of claim 18, wherein the branch device is one of a number of branch devices connected to the end controller and wherein a quantity of data stored on the LSA database is linearly proportional to the number of branch devices connected to the end controller.

20. The system of claim 14, wherein the end controller, when receiving the routing information associated with the plurality of subnetworks using the IPSec messages, is further to receive the routing information associated with the plurality of subnetworks from an internet key exchange (IKE) module of a gateway controller.

* * * * *